United States Patent
Datar et al.

(10) Patent No.: US 10,789,606 B1
(45) Date of Patent: Sep. 29, 2020

(54) GENERATION OF AN ADVERTISEMENT (75) Inventors: Mayur Datar, Pune (IN); Sumit Sanghai, Whitefield Bangalore (IN); Pranav Tiwari, Bangalore (IN); Kiran Panesar, Bellandur Bangalore (IN)

(73) Assignee: Google LLC, Los Gatos, CA (US)

(*) Notice: Subject to any disclaimer, the term of this patent is extended or adjusted under 35 U.S.C. 154(b) by 668 days.

(21) Appl. No.: 13/306,120

(22) Filed: Nov. 29, 2011

(51) Int. Cl.
*G06Q 30/02* (2012.01)

(52) U.S. Cl.
CPC .............. *G06Q 30/0207* (2013.01)

(58) Field of Classification Search
USPC ............................................. 705/7
See application file for complete search history.

(56) References Cited

U.S. PATENT DOCUMENTS

| | | | | |
|---|---|---|---|---|
| 7,778,872 B2* | 8/2010 | Kamangar et al. | ........ | 705/14.52 |
| 2007/0027758 A1* | 2/2007 | Collins | ............... | G06F 17/2785 |
| | | | | 705/14.53 |
| 2007/0260520 A1* | 11/2007 | Jha | ........................ | G06Q 30/02 |
| | | | | 705/14.44 |
| 2009/0138362 A1* | 5/2009 | Schroedl et al. | ............... | 705/14 |
| 2010/0076851 A1* | 3/2010 | Jewell, Jr. | .......... | G06Q 30/0271 |
| | | | | 705/14.67 |
| 2010/0114698 A1* | 5/2010 | Goel | ................. | G06Q 30/0251 |
| | | | | 705/14.49 |
| 2011/0191351 A1* | 8/2011 | Chao | ...................... | G06F 17/30 |
| | | | | 707/748 |

OTHER PUBLICATIONS

Cicekli and Guvenir, "Learning Translation Templates from Bilingual Translation Examples," Applied Intelligence, 15(1):57-76, Jul.-Aug. 2001.
Guvenir and Cicekli, "Learning Translation Templates From Examples," Information Systems, 23(6):353-363, 1998.
Thomas, "Learning T-Wrappers for Information Extraction," In Workshop on Machine Learning in Human Language Technology, 1999, 10 pages.

* cited by examiner

*Primary Examiner* — Afaf Osman Bilal Ahmed
(74) *Attorney, Agent, or Firm* — Fish & Richardson P.C.

(57) ABSTRACT

Aspects of the disclosure assist users with creative development of advertisements by converting successful advertisements into templates for use in the creation of new advertisements. The system and method suggest an advertisement to a user based on the type of content for which the user is advertising. For example, an advertisement may include a set of display criteria, and a set of creative content. The display criteria define a set of circumstances during which the advertisement may be displayed (e.g., a set of keywords that trigger the display of the advertisement). Advertisements that are particularly successful for a given set of display criteria are depersonalized and converted to templates. These templates may be provided during creation of new advertisements as suggested content.

21 Claims, 5 Drawing Sheets

GENERATION OF AN ADVERTISEMENT

BACKGROUND

As access to the Internet has become more and more common, business enterprises have developed new methods to leverage the information superhighway to generate revenue. One of these methods is via the use of displayed advertisements. Such advertisements are typically displayed alongside of web content to increase consumer awareness of products, services, other web content, and the like. Content providers commonly sell these "virtual billboards" to advertisers as part of the content provider's business model. Content providers may charge the advertiser for every impression (e.g., a unique instance where the advertisement is displayed to the user), or for every time the advertisement is selected by the user (e.g., the advertiser is charged every time a user clicks their ad). In other words, the more visible and/or effective the advertisement, the more the content provider can charge to the advertiser.

Many small businesses are also establishing a web presence. These small businesses may not have the resources to hire advertisement agencies to manage their marketing strategy. As such, systems have been developed to allow straightforward access to would-be advertisers on content provider sites. These systems allow even small business owners to have their advertisements provided through large content providers. However, these would-be advertisers may be inexperienced in the design of advertisements, resulting in the creation of inefficient or unsuccessful advertisements.

BRIEF SUMMARY

Aspects of the disclosure assist users with creative development of advertisements by converting successful advertisements into templates for use in the creation of new advertisements. The system and method suggest an advertisement to a user based on the type of content for which the user is advertising. For example, an advertisement may include a set of display criteria, and a set of creative content. The display criteria define a set of circumstances during which the advertisement may be displayed (e.g., a set of keywords that trigger the display of the advertisement). Advertisements that are particularly successful for a given set of display criteria are depersonalized and converted to templates. These templates may be provided during creation of new advertisements as suggested content.

Aspects of the disclosure may provide a computer-implemented method for generating an advertisement. The method may include determining a representative keyword for an advertising context, identifying, using a processor, one or more source advertisements related to the representative keyword, converting at least one of the identified source advertisements into an advertisement template by removing advertiser-specific information from the identified source advertisements, and storing the advertisement template for use in the generation of new advertisements associated with the advertising context. The method may also include scoring the one or more source advertisements in relation to the advertising context, where a score of each of the source advertisements is associated with a relevance of the source advertisement to the advertising context. The relevance may be determined by at least one of the number of impressions for each source advertisement when the representative keyword is used as a search query, a frequency with which the source advertisement is selected when the representative keyword is used as a search query, a ratio of selections to impressions when the representative keyword is used as a search query, and a syntactic similarity of each source advertisement to the representative keyword. The method may include determining a score using website analytics data for each of the source advertisements that are related to the advertising context, and identifying one or more of the source advertisements that are related to the advertising context based on the score. The method may also include identifying one or more duplicate advertisement templates that result from removal of the advertiser specific information from the source advertisements, and eliminating all but one of the one or more duplicate advertisement templates. Each of the source advertisements may include a set of display criteria and a set of creative content. The representative keyword may be identified by at least one of a frequency with which the representative keyword appears in web search queries, a frequency with which the representative keyword appears in web documents, and a frequency with which the representative keyword appears in a first line of advertisement creative content. The method may also include receiving a request to generate a new advertisement for the advertising context, and providing the advertisement template as a suggestion for creative content of the new advertisement. The advertiser-specific information may be at least one of a business name, a phone number, a website address, or a location name. The method may also include replacing the removed advertiser-specific information with a token when the source advertisement is converted to the advertisement template, and providing an interface to replace the token with information pertaining to a particular advertiser during creation of a new advertisement using the advertisement template. The class of product or service may be at least one of a type of product, a type of service, a location, or a user demographic. The method may also include receiving a representative keyword for generation of a new advertisement, selecting an advertisement template corresponding to the representative keyword, populating the selected advertisement template with advertiser-specific content, and generating the new advertisement using the populated template.

Aspects of the disclosure may also provide a processing system for generating an advertisement. The processing system may include at least one processor and a memory, coupled to the processor, for storing one or more advertisement templates. The processor may be configured to receive a representative keyword indicating a business context, select an advertisement template corresponding to the representative keyword, populate the selected advertisement template with advertiser-specific content, and generate new advertisement using the populated template. The new advertisement may be associated with the business context. The processor may be further configured to determine a source representative keyword for an advertising context, identify which of one or more source advertisements are related to the representative keyword, convert at least one of the source advertisements related to the advertising context into an advertisement template by removing advertiser-specific information from the related source advertisement, and store the advertisement template for use in the generation of the new advertisements associated with the advertising context. The advertiser-specific information may be at least one of a business name, a phone number, a website address, or a location name. The processor may be further configured to score the one or more source advertisements in relation to the advertising context, where a score of each of the source advertisements is associated with a relevance of the source advertisement to the advertising context. The relevance may be determined by at least one of the number of impressions for each source advertisement when the representative keyword is used as a search query, a frequency with which the source advertisement is selected when the representative keyword is used as a search query, a ratio of selections to impressions when the representative keyword is used as a search query, and a syntactic similarity of each source advertisement to the representative keyword. The processor may be further configured to determine a score using website analytics data for each of the source advertisements that are related to the advertising context, and identify one or more of the source advertisements that are related to the advertising context based on the score. The processor may also be configured to identify one or more duplicate advertisement templates that result from removal of the advertiser-specific information from the advertising content, and eliminate all but one of the one or more duplicate advertisement templates. Each of the source advertisements may include a set of display criteria and a set of creative content.

Aspects of the disclosure may also provide a computer-implemented method for generating an advertisement. The method may include receiving a representative keyword for generating a new advertisement, the representative keyword associated with an advertising context, selecting an advertisement template corresponding to the representative keyword, wherein the advertisement template is associated with a previous source advertisement identified as being a successful advertisement for the advertising context, populating the selected advertisement template with advertiser-specific content, and generating a new advertisement using the populated template. The method may also include identifying the previous source advertisement as a successful advertisement using web analytics. The web analytics may include analysis of the number of impressions for each source advertisement when the representative keyword is used as a search query, a frequency with which the source advertisement is selected when the representative keyword is used as a search query, a ratio of selections to impressions when the representative keyword is used as a search query, and a syntactic similarity of each source advertisement to the representative keyword. The class of product or service may be at least one of a type of product, a type of service, a location, or a user demographic. The advertiser-specific content may be at least one of a business name, a phone number, a website address, or a location name. The advertiser-specific content may be inserted into the selected advertising template using at least one of a fillable form, user account information, or a business listing.

DETAILED DESCRIPTION

Embodiments of a system and method for generating an advertisement are described. Aspects of the disclosure assist users with creative development of advertisements by converting successful advertisements into templates for use in the creation of new advertisements. The system and method suggest an advertisement to a user based on the type of content for which the user is advertising. For example, an advertisement may include a set of display criteria, and a set of creative content. The display criteria may define a set of circumstances during which the advertisement may be displayed (e.g., a set of keywords that triggers the display of the advertisement). For example, an advertisement might display next to a set of search results when a particular search query is entered, or next to a news article relating to a particular topic. To use a specific example, the owner of a hotel in Hawaii might specify that an advertisement for their hotel should display when a user navigates to content about making travel plans in Hawaii, such as news articles about Hawaii, plane reservations to Hawaii, etc.

The creative content may define a portion of the advertisement that is displayed to the consumer. For example, the creative content may include an image or text that, when selected by the user, takes the user to the web page of the business that owns the advertisement.

Aspects of the disclosure provide for efficient creation of new advertisements, including suggesting creative content. These aspects may track metrics, such as advertisement impressions (e.g., the number of times the display criteria matches the content of a web page, causing the advertisement to be displayed to a user) and the number of clicks (e.g., the number of times a user selects the advertisement). These metrics may be analyzed to identify successful display criteria and creative content.

Aspects may also identify representative keywords. For example, given a set of search queries, "hotels, cheap hotels, affordable hotels," the term "hotels," best encapsulates the content for which the user is searching, as the terms "cheap," and "affordable," are merely adjectives describing the term "hotels." As described above, metrics may be used to determine the representative keywords, such as keywords that are most frequently entered or viewed by users (e.g., for Internet search queries), keywords that are associated with advertisements that are most frequently selected by users, terms frequently chosen for the first line of the advertisement by advertisers, or some other performance metric.

The method and system may identify an advertisement that uses the representative keyword. The advertisement may be the top advertisement associated with the representative keyword based on a performance metric, such as the advertisement that receives the most clicks, or the one displayed most frequently, or some combination thereof.

The identified advertisement may be converted to a template form for use in other advertisements. The identified advertisement may be depersonalized by removing information identifying a particular business, such as a phone number, a web site, or an address from the advertisement. This process depersonalizes the advertisement and places it in suitable form for suggestion to other users.

Aspects may attempt to remove duplicate entries for similar advertisements generated in this manner. For example, if two advertisements become identical when depersonalized, it is inefficient to list both advertisements.

The depersonalized advertisements may be stored for use in the generation of new advertisements. When a user creates a new advertisement, the user may first select a representative keyword or title. The system and method may then perform a lookup operation using the representative keyword or title to identify an associated depersonalized advertisement. The depersonalized advertisement may then be suggested to the user to be modified as the user sees fit. In some aspects, the business specific information removed during the depersonalization process is replaced with fillable fields or a data field that is automatically populated with information specific to the business of the user who is generating the new advertisement. For example, the information "123 Fake Street, Anytown USA," might be replaced with "<ADDRESS>," a field that is automatically filled with the address of the instant business based on data previously entered by the user.

Figure 1:
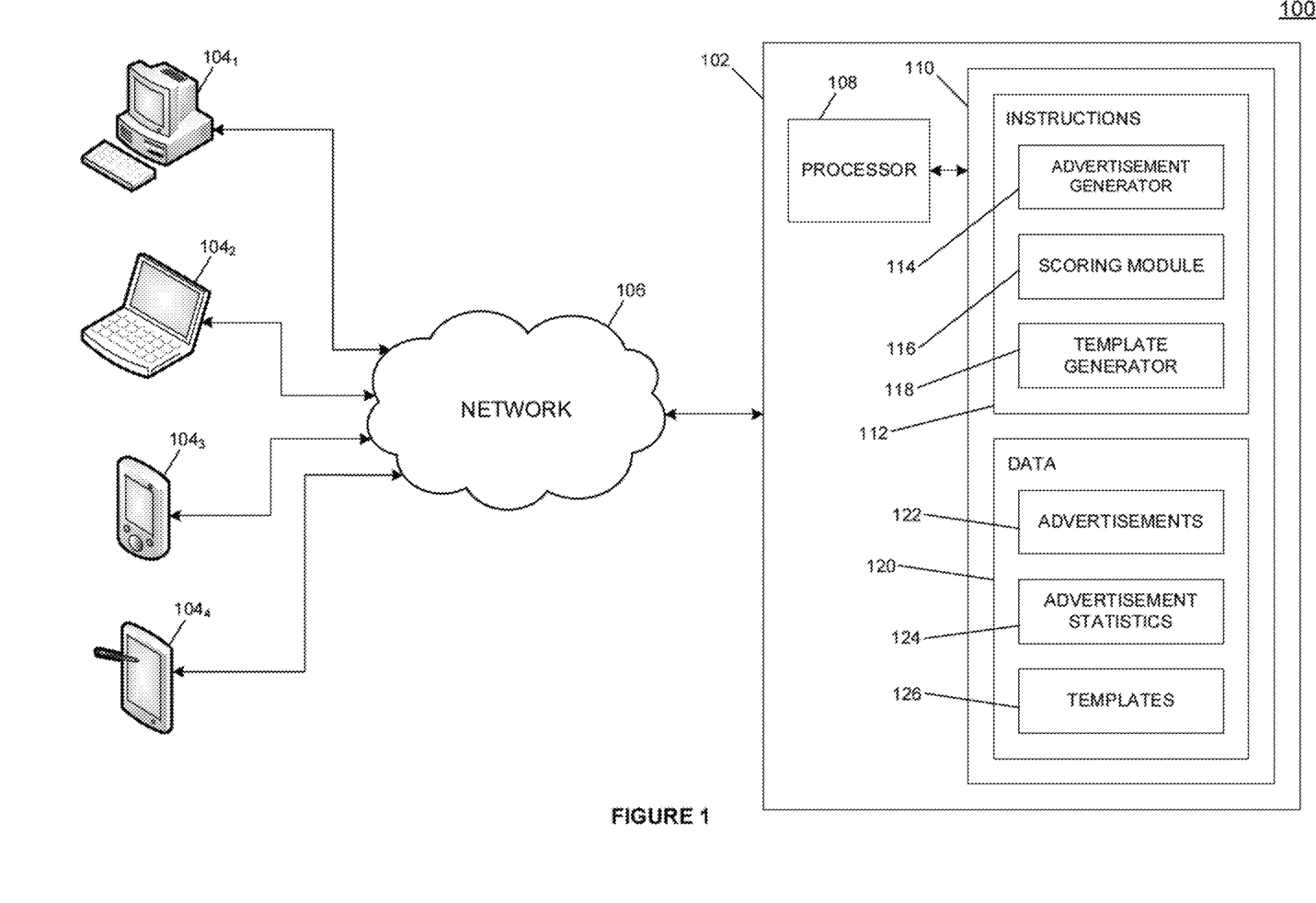
FIG. 1 is a system diagram depicting an example of an advertisement generation system in communication with example client devices in accordance with aspects of the disclosure.

As shown in FIG. 1, an example system 100 in accordance with one aspect includes a server 102 in communication with one or more client devices 104. The client devices 104 may be any device capable of managing data requests via a network 106. Examples of such devices include a personal computer (PC) $104_1$, a laptop computer $104_2$, a smartphone $104_3$, or a tablet computer $104_n$. The client devices 104 may also be any other type of computing device operable to execute computer code, such as a netbook, personal digital assistant ("PDA"), or vehicle on-board computer. Indeed, client devices in accordance with the systems and methods described herein may comprise any device operative to process instructions and transmit data to and from humans and other computers including general purpose computers, network computers lacking local storage capability, etc.

The server 102 is operable to generate an advertisement in response to instructions received from a user via a client device 104. The server 102 may provide suggestions to the client device 104 during the advertisement generation process to improve the quality of the generated advertisements. The server 102 may also manage hosting of the advertisement, including web analytics and other performance metrics for the advertisement.

The server 102 may include a processor 108, a memory 110 and other components typically present in general purpose computers. The memory 110 may store instructions 112 and data 120 that are accessible by the processor 108. The processor 108 may execute the instructions 112 and access the data 120 to control the operations of the server 102. The processor 108 may be any suitable processor, such as various commercially available general purpose processors. Alternatively, the processor 102 may be a dedicated controller such as an application-specific integrated circuit ("ASIC").

The memory 110 may be any type of tangible memory operative to store information accessible by the processor 108, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions 112 and data 120 are stored on different types of media.

The instructions 112 may be any set of instructions to be executed directly (such as machine code) or indirectly (such as scripts) by the processor 102. For example, the instructions may be stored as computer code on a computer-readable medium. In that regard, the terms "instructions" and "programs" may be used interchangeably herein. The instructions may be stored in object code format for direct processing by the processor 108, or in any other computer language including scripts or collections of independent source code modules that are interpreted on demand or compiled in advance. Functions, methods and routines of the instructions are explained in more detail below (see FIGS. 2-5).

The instructions 112 may include an advertisement generator 114, a scoring module 116, and a template generator 118. The advertisement generator 114 may function to assist users in the generation of an advertisement. As described above, a typical advertisement may include a set of display criteria and a set of creative content. The advertisement generator 114 may assist the user in the creation of such an advertisement. The advertisement generator 114 may provide an interface (e.g., a website or fillable form) that allows for creation of a new advertisement. Based on data provided, the advertisement generator 114 may suggest alternate or additional content to supplement or improve the advertisement. For example, the advertisement generator 114 may identify a "best" advertisement (e.g., an advertisement most likely to generate views, hits, and/or product purchases) for a given topic or keyword supplied by the user.

The advertisement generator 114 may suggest the best creative content for use in the newly generated advertisement based on the identified "best" advertisement. Although aspects of the disclosure are described in relation to data supplied by a user (e.g., creative content suggested in response to a user-supplied keyword), the same techniques are also applicable to advertisements that are created in response to advertisement data received from other sources, such as business listing services, really simple syndication ("RSS") data feeds, location-based services, and the like.

The scoring module 116 may score the success of advertisements provided by the server 102. The success of a particular advertisement may be defined in a variety of manners. For example, the scoring module 116 may track the frequency with which the particular advertisement is viewed (e.g., impression counts), the frequency with which the particular advertisement is associated with display criteria entered by a consumer, the frequency that a consumer clicks on the advertisement, the frequency with which a consumer purchases a product based on the advertisement, or any other method that may indicate the success of the particular advertisement. The scoring module 116 may also employ other methods of tracking performance using different metrics and web analytics. These success scores may be stored in a set of advertisement statistics 124. The scoring module 116 may associate particular advertisements with particular sets of display criteria. For example, the scoring module 116 may rank advertisements associated with a particular search keyword based on the scores of those advertisements. Suggestions for advertisements for the particular search keyword may be generated using the top ranked advertisements.

As advertisements are generated and scored, the template generator 118 may create advertisement templates 126 based on successful advertisements identified by the scoring module 116. The scoring module 116 may identify one or more top scoring advertisements for each set of display criteria. The template generator 118 may convert these top advertisements into a format that may be used to suggest advertisement formats for use in the generation of new advertisements. The template generator 118 may remove business-specific information from the top advertisements. Business-specific information removed in this manner may be replaced with tokens to assist with the generation of an advertisement that is personalized for a particular user. An example of an advertisement that has been converted into a template is described further below (see FIG. 3).

Data may be retrieved, stored or modified by the processor 108 in accordance with the instructions 112. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 120 may comprise any information sufficient to identify the relevant information, such as numbers, descriptive text, proprietary codes, references to data stored in other areas of the same memory or different memories (including other network locations) or information that is used by a function to calculate the relevant data.

The data 120 may include one or more advertisements 122, a set of advertisement statistics 124, and one or more templates 126. As described above, the advertisements 122 may include a set of display criteria, and a set of content to be displayed. The advertisement statistics 124 may include website analytics and other metrics that correspond to the advertisements 122. The advertisement statistics 124 may be generated by the advertisement generator 114, the scoring module 116, or any other method of tracking the performance of advertisements. The templates 126 can represent advertisements that have had business-specific information removed. These templates 126 may be used to suggest advertisement formats for the generation of new advertisements by the advertisement generator 114.

Regardless of how data is obtained, appropriate efforts can be taken to protect user privacy. For example, collection of data may be on an opt-in basis so that data is not collected or used unless the user has been informed of the collection and planned use of data and provided permission for such collection and use to occur, with the data stored and handled in a secure manner.

Although FIG. 1 functionally illustrates the processor 108 and memory 110 as being separate, single blocks, it should be understood that the processor 108 and memory 110 may actually include multiple processors and memories that may or may not be stored within the same physical housing. Accordingly, references to a processor, computer or memory will be understood to include references to a collection of processors, computers or memories that may or may not operate in parallel.

The server 102 may be at one node of the network 106 and be operative to directly and indirectly communicates with other nodes of the network. For example, the server 102 may include a web server that is operative to communicate with client devices 104 via the network 106 such that the server 102 uses the network 106 to transmit and display information to a user on a display of the client device.

The system can provide privacy protections for the client data including, for example, anonymization of personally identifiable information, aggregation of data, filtering of sensitive information, encryption, hashing or filtering of sensitive information to remove personal attributes, time limitations on storage of information, and/or limitations on data use or sharing. Data can be anonymized and aggregated such that individual client data is not revealed. A user may also be provided with an opportunity to opt in/out to enable the collection of sharing of data. In particular, aspects of the disclosure may allow the user to choose whether creative content created by the user is included in the generation of advertisement templates and other means of suggestion of advertisements to other users.

A user may elect to be identified as the creator of a source advertisement that provides the basis for the template. This authorship information may be displayed with advertisements constructed with the template. In this manner, users may be recognized for providing successful advertisements. Compensation may be provided to, or received from, users for this service.

The network 106, and the intervening nodes between the server 102 and the client devices 104, may include various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Although some functions are indicated as taking place on the server 102 and other functions are indicated as taking place on the client devices 104, various aspects of the system and method may be implemented by a single computer having a single processor. It should be appreciated that aspects of the system and method described with respect to the client may be implemented on the server, and vice-versa.

Figure 2:
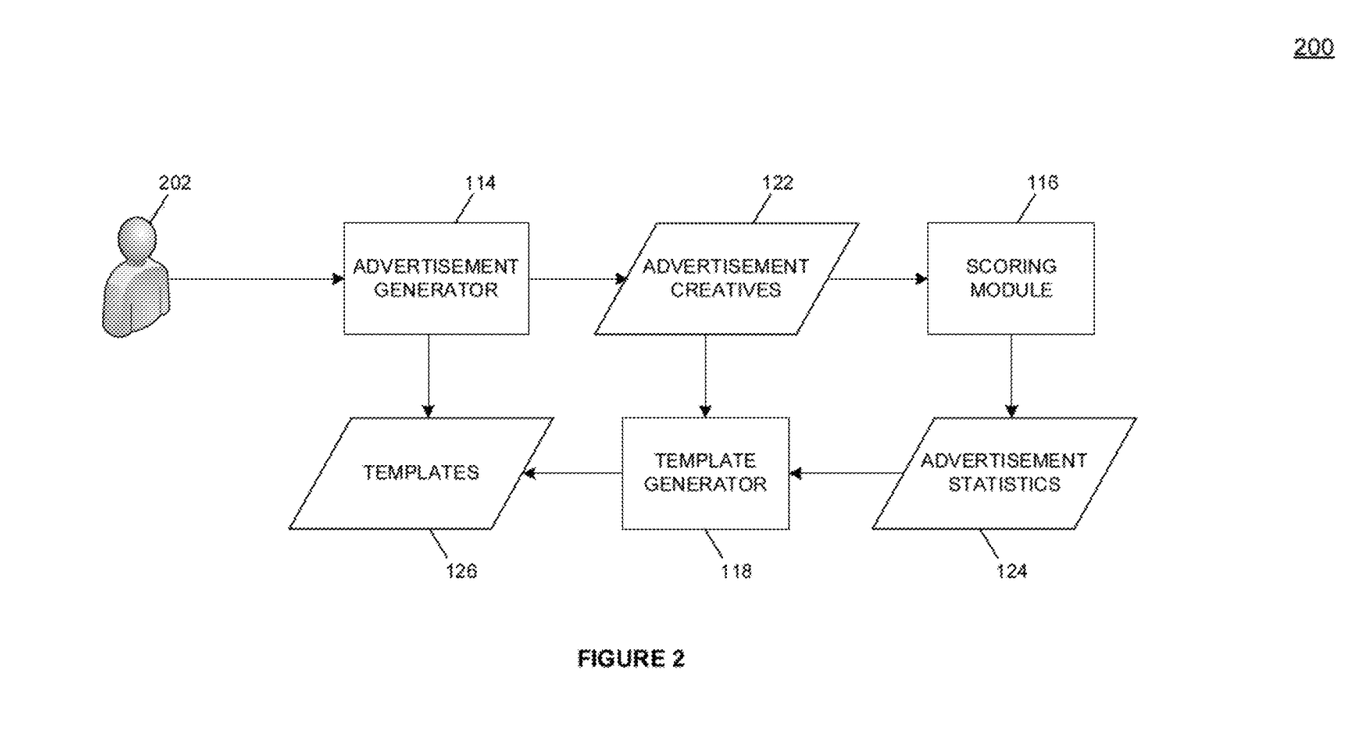
FIG. 2 is block diagram depicting an example of a data flow for generating an advertisement in accordance with aspects of the disclosure.

FIG. 2 is block diagram depicting an example of a data flow 200 for generating an advertisement in accordance with aspects of the disclosure. The data flow 200 describes how information is processed by a system, such as the server 102, for creating advertisements. An external data source 202 (e.g., a user of a client device 104) may submit information to an advertisement generator 114. In the present example, the external data source 202 is a user, but, as described above with respect to FIG. 1, any external data source that provides information for generating an advertisement may be used. For example, a user may wish to create a new advertisement for their product or service, to be displayed alongside of search results for that product or service. In such a case, the user might submit one or more keywords corresponding to a relevant search query, and a set of creative content describing the user's product or service.

The advertisement generator 114 may assist the user in generation of the new advertisement. In addition to providing an interface for generation of a new advertisement "from scratch," the advertisement generator 114 may also provide the user with suggestions. For example, the advertisement generator 114 may receive a keyword from the user, and suggest advertisement formats that have been successful in association with the received keyword. The suggestion process may suggest one or more advertisement templates 126. The creation of these advertisement templates 126 is described further below with respect to the data flow 200 and FIGS. 3-4.

Using input from the external data source 202, the advertisement generator 114 may create an advertisement 122. As described above, the advertisement 122 may include display criteria and creative content, where the display criteria controls when the advertisement is displayed, and the creative content controls the content that is displayed to the potential consumer. Once generated, the advertisement 122 is hosted to consumers in accordance with the display criteria and any agreement that the external data source 202 has for hosting. For example, the owner of the external data source 202 may enter in an agreement with the owner of the server 102 to pay a fee for every consumer that selects the advertisement 122, or any other arrangement.

The success of an advertisement 122 may be tracked by a scoring module 116. As described above with respect to FIG. 1, the scoring module 116 may assign a score or ranking to each advertisement. These scores and rankings may be categorized by the display criteria for each advertisement. For example, the scoring module 116 may identify a representative keyword for each advertisement, and compare each advertisement with the other advertisements associated with the same or similar representative keywords to determine an optimal advertisement or advertisements for the representative keyword.

The scoring module 116 may use metrics and web analytics to create a set of advertisement statistics 124 based on the success of the advertisement 122. The advertisement statistics 124 may indicate that a particular advertisement 122 is particularly successful for particular display criteria, such as particular representative keywords. This measurement of "success" may be performed in various manners, such as described above with respect to FIG. 1. The advertisement statistics 124 thus provide an indication of which advertisement 122 is the most successful. Thus most successful advertisement is likely worth converting to an advertisement template for use in the generation of new advertisements.

The template generator 118 may use the advertisement statistics 124 to identify suitable advertisements 122 for depersonalization. The advertisement 122 identified for depersonalization may be stripped of content that specifically identifies the associated business. References to the particular business, such as phone number, website address, street address, and the like, may be replaced with tokens to allow for customization. An example of a depersonalized advertisement is described further below (see FIG. 3). These templates 126 may be used by the advertisement generator 114 to suggest content for future advertisements associated with the same and similar display criteria.

Figure 3:
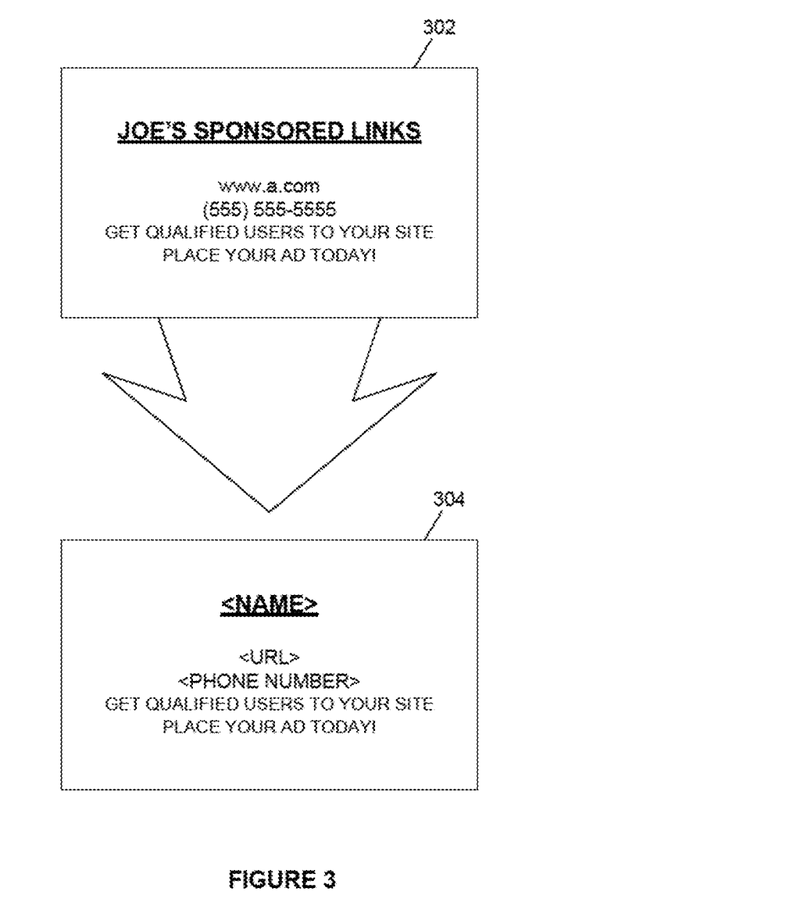
FIG. 3 is an illustration of an example of an advertisement converted into an advertisement template in accordance with aspects of the disclosure.

FIG. 3 is an illustration of an example of a source advertisement 302 converted into an advertisement template 304 in accordance with aspects of the disclosure. The source advertisement 302 contains information specific to the company that created the advertisement (e.g., the company name, phone number, and website address), and also generic creative content (e.g., "Get qualified users to your site" and "Place your ad today!"). The depersonalization process may extract the information that is specific to the particular business and replace that information with one or more tokens.

The advertisement template 304 may depict the source advertisement 302 after the business-specific information is extracted. As can be seen from the example, the name of the business has been replaced with the "<NAME>" token, the website uniform resource locator ("URL") has been replaced with the "<URL>" token, and the business phone number has been replaced with the "<PHONE NUMBER>" token. These tokens may be used by an advertisement generator to automatically fill in information specific to a user's business, or to prompt the user to fill in these specific bits of information.

Figure 4:
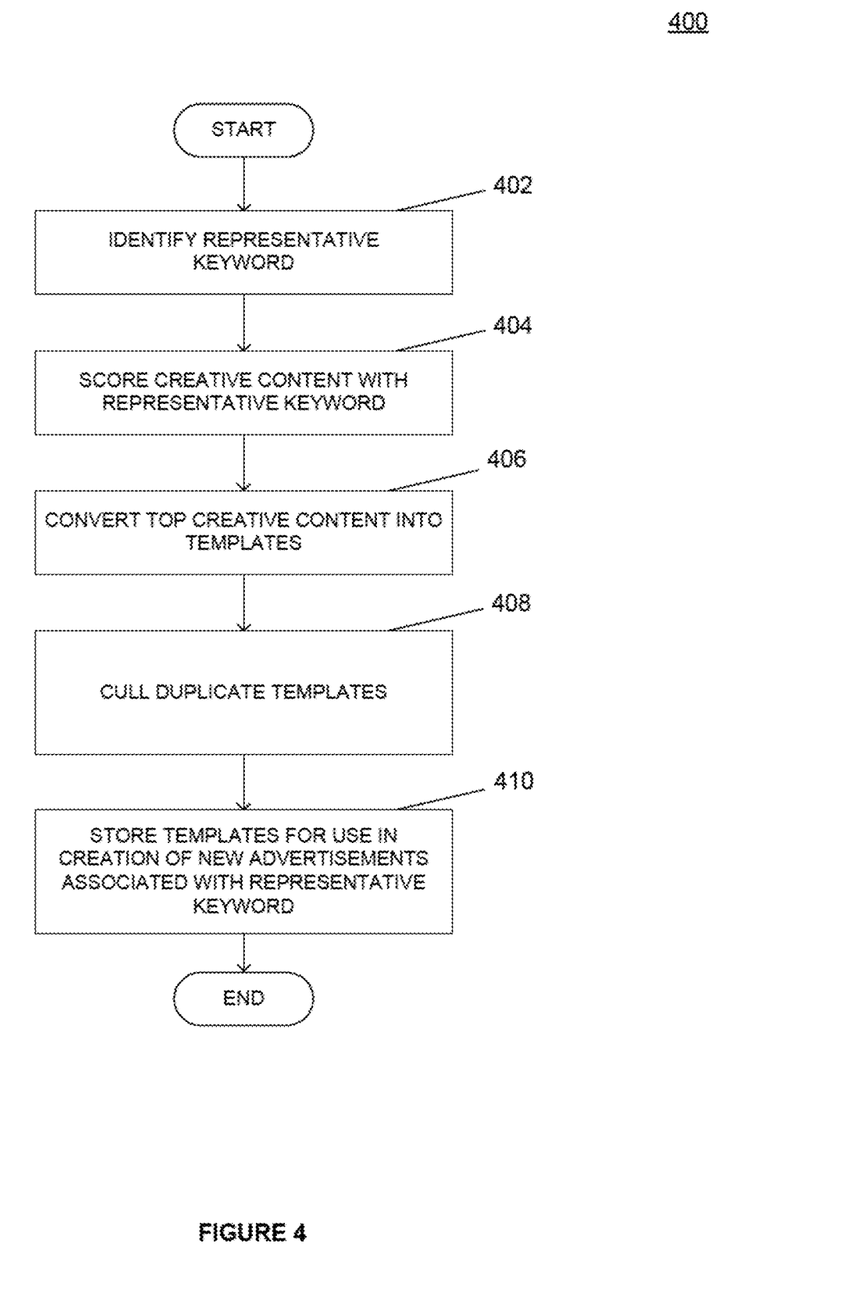
FIG. 4 is a flow diagram depicting an example of a method for creating an advertisement template in accordance with aspects of the disclosure.

FIG. 4 is a flow diagram depicting an example of a method 400 for creating an advertisement template in accordance with aspects of the disclosure. The method 400 may be operable to create a set of advertisement templates such that the templates may be used to guide the creation of new advertisements. The templates may be based on source advertisements that are known to be successful. The use of templates in this manner attempts to capture creative elements that resulted in the success of the source advertisements, thus improving the success rate of advertisements generated based on the templates. The method functions by identifying one or more representative keywords. These representative keywords may be typically associated with particular business contexts. These business contexts may define types of products or services with common or similar features, such as, for example, "Hotels" or "Chiropractors." These representative keywords may correspond to display criteria for an advertisement.

The identified one or more representative keywords may be compared to creative content to determine which sets of creative content are relevant to each representative keyword. The identified creative content for each representative keyword may be compared with other creative content associated with the same keyword to identify a "top" "best" or "optimal" set of creative content for each representative keyword. For example, the "best" set of creative content may be identified as the creative content that received the most user impressions for a particular representative keyword, the creative content that resulted in the most user clicks when displayed in response to a particular representative keyword, the creative content that resulted in the most product purchases when displayed with a particular representative keyword, the creative content that achieved the most success among a particular target demographic, or the creative content that best achieved an advertiser's campaign goals or objective. For example, advertisers may be allowed to rate the effectiveness of particular advertisements, including how well various goals of an advertising campaign were achieved (e.g., raising brand name recognition, raising awareness of a particular product feature, associating product with a particular quality, etc.). These effectiveness ratings may be presented during the creation of a new advertisement to assist with template selection. These methods of determining the "best" set of creative content associated with a keyword are not intended to be limiting. Aspects of the disclosure may combine these metrics or utilize other methods to identify an optimal set of creative content for the particular keyword. These top sets of creative content may be used to create templates for use in the creation of future sets of creative content.

At stage 402, a representative keyword may be identified. The representative keyword may function as an index value or subject heading to guide the creation of the advertisement template. Representative keywords may typically capture the most prevalent, grammatically correct, and/or well-crafted form(s) of an input set of keywords or other display criteria. For example, a user may desire to create a new advertisement associated with the phrase "Cheap Hotel Rates." Of these three keywords, "Cheap" and "Rates" have little relevancy when removed from the context of hotels, such that in and of themselves, they do little to describe the type of product or service to which the advertisement is related. As such, it would be appropriate to associate the advertisement with the key word "Hotel," rather than "Cheap" or "Rates."

A determination of "representativeness" (e.g., how well a particular term represents a particular class of products or services) may be made in a variety of manners. For example, the frequency at which a given term appears in a web search query (e.g., via a search engine), the frequency at which a given term appears in Internet search results, or the frequency at which a given term appears in the first line of creative content may be indicative of a high level of representativeness. Rather than using any one of the above methods, aspects of the disclosure may combine these metrics or utilize other methods to determine how representative a particular term is. Terms that have a "representativeness" value above a particular threshold value may be identified as "representative keywords" for use in later stages of the method 400. For example, given a set of keywords or other display criteria, the method may pick the top 1 or 2 representative keywords or criteria based on the count of how often the representative keywords are selected by other advertisers. As described above, a given representative keyword may be associated with a particular business context.

Rather than identify specific representative keywords, aspects of the disclosure may also identify representative families of keywords. For example, the terms "Hotel," "Hotels," "Motel," "Motels," "Lodge," "Lodges," "Inn," and "Inns," might all be determined to be part of the same representative keyword family. These terms may be filtered such that redundant terms are eliminated (e.g., combining the results of "Inn" and "Inns" or "Hotels" and "Motels").

At stage 404, creative content may be scored against the identified representative keyword. This score may capture how relevant the particular advertisement is to the identified representative keyword. Various metrics may be used to determine the relevancy of the advertisement to the representative keyword. For example, some of these metrics may include the number of impressions for the advertisement when the particular representative keyword was present in a user search query, the number of clicks for the advertisement when the particular representative keyword was present in a user search query, the ratio of clicks to impressions for the advertisement when the keyword was present in a user search query, the syntactic similarity between the creative and the keyword (e.g., the number of unigram and bigram overlaps between the two texts, weighted by the inverse document frequency of the n-grams), or any combination of the above. For example, one possible scoring function for scoring a creative against a particular representative keyword is as follows:

$$\text{score} = (\text{weight\_1} * \text{impression\_count}) + (\text{weight\_2} * \text{selection\_count}) \quad \text{(Eq. 1)}$$

Impression_count may represent the number of impressions for the creative when a search query is same as keyword. Selection_count may represent the number of clicks for the creative when the query was same as keyword. The weights, weight_1 and weight_2, may be hand tuned or chosen automatically by another system to increase or decrease the respective importance of each metric. The scoring process may also include a ranking operation. For example, website analytical methods may be used to rank each set of creative content based upon the score assigned to the set of creative content. In this manner, the "top" one or more sets of creative content that are also associated with the representative keyword are identified. Although the term "top" is used, any number "n" of advertisements may be identified for storage and use in the suggestion process.

At stage 406, the top sets of creative content identified at stage 404 may be converted into templates. These templates may reflect the creative content of a particular advertisement that has had advertiser-specific information removed. For example, this depersonalization process may include removing any reference to numbers, symbols, brand names, merchant names, and/or location names. Certain terms and elements may use alternate dictionaries or nomenclatures. For example, a separate dictionary of brand and merchant names may be maintained for each representative keyword, as certain brand names may be personally relevant in some fields but not others. Certain other terms may be exempted from the depersonalization process. For example, while numbers are generally indicative of advertiser-specific information (e.g., street numbers and phone numbers), some numeric terms may not be advertiser-specific (e.g., "open 24/7" or "available 365 days/year"). The depersonalization process may replace advertiser-specific information with tokens, such as described above (see FIG. 3). These tokens serve to identify where content should be added to the template when the template is used to generate a new set of creative content.

After converting the sets of creative content to templates, duplicate entries may exist. For example, the business names "Joe's Pizza Shack" and "Steve's Pizza Shack" might both read as "<NAME>'s Pizza Shack" after they are depersonalized. At stage 408, these duplicate entries are culled. Duplicates may be identified by noting exact copies, or with a certain allowance for word order and/or choice. For example, the advertising slogan "Best Pizza In Town" and the slogan "Best Pizza In the City" might be identified as duplicate entries, since the terms "the City" and "Town" are synonyms. Various other methods of identifying duplicate entries may also be employed, including allowing replacement, deletion, or reordering of words that are less important (e.g., "of," "an," "the," "and," etc.). As part of the duplicate culling processes, sets of creative content may also be broken into sentences or phrases. Each sentence or phrase may be converted into an order independent hash of the terms in the sentence or phrase. These hashes may be used for efficient identification of duplicate templates. When eliminating duplicates, the success metric associated with duplicate entries may be combined to generate a single metric for the entry. The combination may follow different methods such as picking the highest value or picking a weighted average of values where the weight corresponds to number of impressions, clicks or purchases.

The set of depersonalized templates that remain after the duplicate culling process may be stored for later use at stage 410. These templates may be stored with reference to the representative keyword with which they are associated for later suggestion during an advertisement generation process. The stored templates may be organized by representative keyword, and ranked in order of relevance or success for the representative keyword. Thus, when a user wishes to generate a new advertisement associated with the representative keyword, the user may be provided with a set of templates that have been verified as defining successful advertisements.

Figure 5:
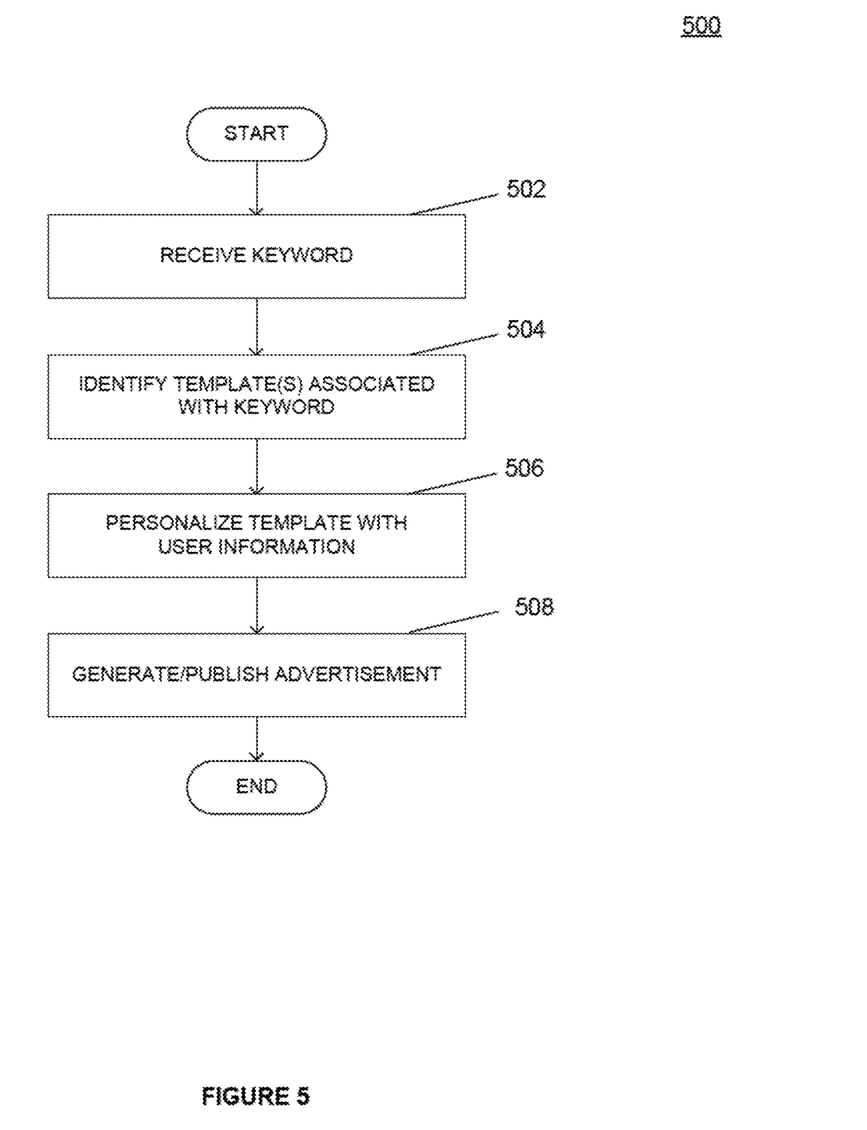
FIG. 5 is a flow diagram depicting an example of a method for generating an advertisement using an advertisement template in accordance with aspects of the disclosure.

FIG. 5 is a flow diagram depicting an example of a method 500 for generating an advertisement using an advertisement template in accordance with aspects of the disclosure. By converting successful advertisements into templates (see FIG. 4), these templates may be used to improve the success rates of newly created advertisements. Upon receipt of a particular advertisement keyword during the advertisement creation process, templates that are associated with the keyword may be suggested for use in creation of a new advertisement. In this manner the success of previous advertisements may be leveraged to improve the quality of newly generated advertisements.

At stage 502, a keyword may be received for use in the generation of a new advertisement. The keyword may be provided by a user to define display criteria for the new advertisement. For example, if the user wishes to display an advertisement for a hotel in New York City, the user might select the keywords "Hotel" and "New York City." The advertisement would thus be displayed in contexts that relate to hotels, New York City, or both. The user may specify multiple keywords. For example, the user may specify a plurality of keywords during the advertisement generation process, with each keyword being associated with an additional listing fee paid by the user.

Each keyword may be associated with one or more "top" templates which are presented to the user when the user provides the key word. At stage 504, the template or templates that most closely relate to the keyword or keywords identified at stage 502 may be presented. If the user specifies more than one keyword, then templates associated with each specified keyword may be identified. Individual templates may also be scored against multiple representative keywords, such that templates that are highly relevant with more than one specified keyword are identified for presentation during the advertisement creation process. Templates may be identified as being particularly successful for different goals (e.g., raising brand awareness, appeal to a particular demographic) to assist the user in selecting an appropriate template. The user may specify the particular goal prior to selecting a representative keyword to assist with selecting an optimal template.

The templates may be personalized with user-specific information to generate the new advertisement. At stage 504, user-specific information may be added to the templates to ensure that the templates relate to the user's particular product or service. In some cases, a particular template may be selected from a list of appropriate templates for personalization. The user may be presented with this list, and a particular template may be selected in response to a user selection operation performed on the list. The template may include one or more tokens that represent where personal information was redacted from the original source advertisement (see FIG. 3 and FIG. 4, stage 408). The user may be prompted to fill in fields corresponding to these tokens upon selection of the template. In some aspects, each token may be automatically replaced with user-specific information as extracted from user data, such as account information, business listing information associated with the user, or a particular business listing selected by the user. The user may be prompted to customize the advertisement before or after the user-specific information is combined with the template.

At stage 508, the newly customized advertisement may be generated and/or published for use. The publication process may include adding the advertisement to a database which stores the display criteria and creative content of the advertisement. This database may be referenced by various servers and processes for hosting of the advertisement. Website analytical data may be tracked for the advertisement once it is "live," and this data may be used to determine whether the advertisement should be converted into a new template. The method 500 ends after creation of the new advertisement.

The stages of the illustrated methods are not intended to be limiting. The functionality of the methods can exist in a fewer or greater number of stages than what is shown and, even with the depicted methods, the particular order of events may be different from what is shown in the figures.

The systems and methods described herein advantageously provide for an improved process for generating creative content for advertising. By identifying successful advertisements and associating those advertisements with particular representative keywords, these successful advertisements may be used as templates for the generation of new advertisements in the same fields. The success of these newly generated advertisements may be monitored in the same way to adaptively improve the quality of advertisements over time. Users may also benefit from increased advertisement impressions and clicks by harnessing successful aspects of other advertisements in the same product areas.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method for generating an advertisement, the method comprising:
   identifying, by a processor, a plurality of source advertisements that are each associated with a representative keyword for an advertising context;
   determining, by the processor and for each particular source advertisement of the plurality of source advertisements, a respective score for the particular source advertisement, the respective score indicating a measure of historical performance of the particular source advertisement;
   ranking the plurality of source advertisements in an order according to the scores;
   selecting, by the processor, a first source advertisement, among the plurality of source advertisements, based on the first source advertisement being highest ranked among the plurality of source advertisements;
   identifying, by the processor, a portion of content presented in the first source advertisement that is specific to a first advertiser that sponsors the first source advertisement;
   converting the first source advertisement into a first advertisement template by replacing, in the first source advertisement, the identified portion of content presented in the first source advertisement that is specific to the first advertiser with one or more tokens that do not identify the first advertiser, wherein the one or more tokens indicate constraints for content that is permitted to be added to the first advertisement template to generate new advertisements;
   identifying that a second advertisement template is duplicative of the first advertisement template that was converted from the first source advertisement, wherein the second advertisement template was converted from a second source advertisement different from the first source advertisement;

in response to identifying that the second advertisement template is duplicative of the first advertisement template that was converted from the first source advertisement, deleting the second advertisement template; and generating, by the processor, a new advertisement using the first advertisement template by replacing the one or more tokens in the first advertisement template with content that is specific to a second advertiser that is different from the first advertiser.

2. The method of claim 1, wherein determining the respective score for the first source advertisement includes generating the respective score based on at least one of a number of impressions for the first source advertisement when the representative keyword is used as a search query, a frequency with which the first source advertisement is selected when the representative keyword is used as a search query, a ratio of selections of the first source advertisement to impressions of the first source advertisement when the representative keyword is used as a search query, or a syntactic similarity of the first source advertisement to the representative keyword.

3. The method of claim 1, wherein the first source advertisement comprises a set of display criteria and a set of creative content.

4. The method of claim 1, further comprising identifying the representative keyword based on at least one of a frequency with which the representative keyword appears in web search queries, a frequency with which the representative keyword appears in web documents, or a frequency with which the representative keyword appears in a first line of advertisement creative content.

5. The method of claim 1, comprising:
after the converting, receiving a selection of the representative keyword on behalf of a third advertiser;
retrieving the first advertisement template based on the selection;
processing the first advertisement template including locating the one or more tokens within data representing the first advertisement template;
dynamically loading the first advertisement template with information associated with the third advertiser to generate a second new advertisement that presents content that is specific to the third advertiser, including automatically replacing each token of the located one or more tokens with the content that is specific to the third advertiser; and
providing, to a computing device remote from the processor, code that is configured to cause the computing device to display the second new advertisement in a user interface that includes search results responsive to the representative keyword.

6. The method of claim 1, wherein the portion of content presented in the first source advertisement that is specific to the first source advertiser comprises at least one of a business name, a phone number, a website address, or a location name.

7. The method of claim 1, wherein the representative keyword represents at least one of a type of product, a type of service, a location, or a user demographic associated with the advertising context.

8. A processing system for generating an advertisement, the processing system comprising:
at least one processor; and
a memory, coupled to the at least one processor, for storing one or more advertisement templates;
wherein the at least one processor is configured to:
identify a representative keyword indicating a business context;
identify a plurality of source advertisements related to the representative keyword;
determine, for each particular source advertisement of the plurality of source advertisements, a respective score for the particular source advertisement, the respective score indicating a measure of historical performance of the particular source advertisement;
rank the plurality of source advertisements in an order according to the scores;
select a first source advertisement, from among the plurality of source advertisements, based on the rank;
identify a portion of content presented in the first source advertisement that is advertiser-specific for a first advertiser;
convert the first source advertisement into a first advertisement template by replacing, in the first source advertisement, the identified portion of content that is advertiser-specific for the first advertiser with one or more tokens that do not identify the first advertiser, wherein the one or more tokens indicate constraints for content that can be added to the first advertisement template to generate new advertisements;
identify that a second advertisement template is duplicative of the first advertisement template that was converted from the first source advertisement, wherein the second advertisement template was converted from a second source advertisement different from the first source advertisement;
in response to identifying that the second advertisement template is duplicative of the first advertisement template that was converted from the first source advertisement, delete the second advertisement template; and
generate a new advertisement using the first advertisement template by replacing the one or more tokens in the first advertisement template with content that is specific to a second entity other than the first advertiser.

9. The processing system of claim 8, wherein the identified portion of content that is specific to the first advertiser associated with the first source advertisement includes at least one of a business name, a phone number, a website address, or a location name.

10. The processing system of claim 8, wherein the determining the respective score for the first source advertisement includes generating the respective score based on at least one of a number of impressions for the first source advertisement when the representative keyword is used as a search query, a frequency with which the first source advertisement is selected when the representative keyword is used as a search query, a ratio of selections of the first source advertisement to impressions of the first source advertisement when the representative keyword is used as a search query, or a syntactic similarity of the first source advertisement to the representative keyword.

11. The processing system of claim 8, wherein the first source advertisement comprises a set of display criteria and a set of creative content.

12. The method of claim 1, wherein identifying the portion of content presented in the first source advertisement that is specific to the first advertiser comprises:
accessing, from among a plurality of dictionaries that are associated with different keywords, a first dictionary that is associated with the representative keyword for the advertising context;
determining whether one or more terms that occur in the first source advertisement also occur in the first dictionary; and
in response to determining that the one or more terms that occur in the first source advertisement do not occur in the first dictionary, designating the one or more terms as content that is specific to the first advertiser.

13. The method of claim 1, wherein the one or more tokens in the first advertising template indicate where subsequent advertiser-specific content is to be added to the advertising template to generate new advertisements.

14. The method of claim 1, wherein generating the new advertisement using the first advertisement template comprises loading the first advertisement template for presentation to a user in an environment that enables the user to edit the loaded advertisement template so as to complete generation of the new advertisement.

15. The method of claim 1, further comprising determining the constraints indicated by the one or more tokens, for content that is permitted to be added to the first advertisement template to generate new advertisements, based on the identified portion of content presented in the first source advertisement that is specific to the first advertiser.

16. The method of claim 1, wherein the constraint for a first token among the one or more tokens indicates that content that is permitted to be added to the first advertisement template in place of the first token to generate new advertisements is required to be a phone number, a universal resource locator (URL), a business name, or an address.

17. A non-transitory computer-readable medium having instructions stored thereon that, when executed by a processor, cause performance of operations comprising:
identifying a plurality of source advertisements that are each associated with a representative keyword for an advertising context;
determining, for each particular source advertisement of the plurality of source advertisements, a respective score for the particular source advertisement, the respective score indicating a measure of historical performance of the particular source advertisement;
ranking the plurality of source advertisements in an order according to the scores;
selecting a first source advertisement, among the plurality of source advertisements, based on the first source advertisement being highest ranked among the plurality of source advertisements;
identifying a portion of content presented in the first source advertisement that is specific to a first advertiser that sponsors the first source advertisement;
converting the first source advertisement into a first advertisement template by replacing, in the first source advertisement, the identified portion of content presented in the first source advertisement that is specific to the first advertiser with one or more tokens that do not identify the first advertiser, wherein the one or more tokens indicate constraints for content that is permitted to be added to the first advertisement template to generate new advertisements;
identifying that a second advertisement template is duplicative of the first advertisement template that was converted from the first source advertisement, wherein the second advertisement template was converted from a second source advertisement different from the first source advertisement;
in response to identifying that the second advertisement template is duplicative of the first advertisement template that was converted from the first source advertisement, deleting the second advertisement template; and
generating a new advertisement using the first advertisement template by replacing the one or more tokens in the first advertisement template with content that is specific to a second advertiser that is different from the first advertiser.

18. The non-transitory computer-readable medium of claim 17, wherein determining the respective score for the first source advertisement includes generating the respective score based on at least one of a number of impressions for the first source advertisement when the representative keyword is used as a search query, a frequency with which the first source advertisement is selected when the representative keyword is used as a search query, a ratio of selections of the first source advertisement to impressions of the first source advertisement when the representative keyword is used as a search query, or a syntactic similarity of the first source advertisement to the representative keyword.

19. The non-transitory computer-readable medium of claim 17, wherein the first source advertisement comprises a set of display criteria and a set of creative content.

20. The non-transitory computer-readable medium of claim 17, wherein the representative keyword is identified based on at least one of a frequency with which the representative keyword appears in web search queries, a frequency with which the representative keyword appears in web documents, or a frequency with which the representative keyword appears in a first line of advertisement creative content.

21. The method of claim 5, further comprising:
in response to receiving the selection of the representative keyword on behalf of the second advertiser, providing the first advertisement template as a suggestion for creative content of a new advertisement for the second advertiser.

* * * * *